(12) United States Patent
Tsuzuki (10) Patent No.: US 10,280,874 B2
(45) Date of Patent: May 7, 2019

(54) FLOW CONTROL VALVE AND FUEL VAPOR PROCESSING APPARATUS INCORPORATING THE FLOW CONTROL VALVE

(71) Applicant: AISAN KOGYO KABUSHIKI KAISHA, Obu-shi, Aichi-ken (JP)

(72) Inventor: Yasuhiro Tsuzuki, Aichi-ken (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 367 days.

(21) Appl. No.: 14/962,108

(22) Filed: Dec. 8, 2015

(65) Prior Publication Data

US 2016/0186697 A1    Jun. 30, 2016

(30) Foreign Application Priority Data

Dec. 25, 2014 (JP) ................. 2014-263146

(51) Int. Cl.
*F16K 1/36* (2006.01)
*F16K 17/196* (2006.01)
*F02M 25/08* (2006.01)

(52) U.S. Cl.
CPC ...... *F02M 25/0836* (2013.01); *F02M 25/089* (2013.01); *F16K 1/36* (2013.01); *F16K 17/196* (2013.01); *Y10T 137/7772* (2015.04)

(58) Field of Classification Search
CPC ......... Y10T 137/7772; Y10T 137/7773; Y10T 137/7774; Y10T 137/7775;
(Continued)

(56) References Cited

U.S. PATENT DOCUMENTS 2,088,226 A * 7/1937 Arvintz ................. F16K 17/196
137/493.4
2,171,168 A * 8/1939 Swank ................. F01P 11/0238
137/493.3
(Continued)

FOREIGN PATENT DOCUMENTS

CN 101749462 A 6/2010
CN 201810836 U 4/2011
(Continued)

OTHER PUBLICATIONS

Japanese Office Action dated Oct. 19, 2017, for Japanese Application No. 2014-263146 (5 p.).
(Continued)

*Primary Examiner* — William M McCalister
(74) *Attorney, Agent, or Firm* — Conley Rose, P.C.

(57) ABSTRACT

A flow control valve including a passage, and first and second valve devices disposed in the passage and comprising first and second valve members, valve seats, and seal members, respectively. Each valve member is movable for opening and closing the passage. Each seal member may seal between the corresponding valve member and seat. The first valve member moves in a first direction toward a closing position of the first valve device. The second valve member moves in a second direction, opposite the first closing direction, toward a closing position of the second valve device. The first or the second seal member may include a base portion attached to one of the corresponding valve member and the corresponding valve seat, a lip extending from the base portion, and a turning-up inhibiting device configured to inhibit the lip from turning up when the corresponding valve member is in the closing position.

16 Claims, 7 Drawing Sheets

(58) Field of Classification Search
CPC ........... Y10T 137/7776; Y10T 137/777; Y10T 137/778; F02M 25/0836; F02M 25/089; F16K 17/196; F16K 1/36
USPC ......... 137/493.1, 493.2, 493.3, 493.4, 493.5, 137/493.6, 493.9
See application file for complete search history.

(56) References Cited

U.S. PATENT DOCUMENTS

| | | | | | |
|---|---|---|---|---|---|
| 2,191,636 | A | * | 2/1940 | Nelson | F01P 11/02 137/493.4 |
| 2,530,285 | A | * | 11/1950 | Catranis | A61F 2/64 137/493.6 |
| 2,735,443 | A | * | 2/1956 | Beck | F16K 17/196 137/493.3 |
| 3,061,138 | A | * | 10/1962 | Edelmann | F01P 11/0238 137/493.4 |
| 3,108,610 | A | * | 10/1963 | De See | F16K 17/196 137/493 |
| 3,112,763 | A | * | 12/1963 | Tennis | F16K 17/18 137/493.5 |
| 3,125,117 | A | * | 3/1964 | Borgard | B60T 11/22 137/493.4 |
| 3,153,423 | A | * | 10/1964 | Biello | F16K 17/196 137/493.5 |
| 3,195,567 | A | * | 7/1965 | Cummings | B60T 15/46 137/493.4 |
| 3,722,535 | A | * | 3/1973 | Raupp | B65D 90/34 137/493.4 |
| 3,881,507 | A | * | 5/1975 | Stump | B60K 15/0406 137/493.4 |
| 3,971,406 | A | * | 7/1976 | Inada | B60K 15/03519 137/493.4 |
| 4,023,583 | A | * | 5/1977 | Parkinson | F16K 17/196 137/39 |
| 4,691,734 | A | * | 9/1987 | Fort | F16K 17/04 137/493.4 |
| 5,282,492 | A | * | 2/1994 | Angeli | F16K 17/196 137/493.4 |
| 6,026,848 | A | * | 2/2000 | Huynh | F16K 17/196 137/493.1 |
| 6,305,412 | B1 | * | 10/2001 | Steele | F16K 17/196 137/493.4 |
| 6,619,497 | B2 | * | 9/2003 | Freiler | F16K 17/196 137/493.5 |
| 6,929,025 | B2 | | 8/2005 | Sato | |
| 7,086,388 | B2 | * | 8/2006 | Roth | F16K 17/196 123/510 |
| 2003/0150492 | A1 | * | 8/2003 | Sato | F16K 17/196 137/493.6 |
| 2010/0288242 | A1 | * | 11/2010 | Makino | F02M 25/0836 123/521 |
| 2011/0162728 | A1 | | 7/2011 | Pifer et al. | |
| 2014/0060661 | A1 | * | 3/2014 | Miura | F02M 25/0836 137/12 |
| 2014/0216574 | A1 | | 8/2014 | Onodera | |

FOREIGN PATENT DOCUMENTS

| | | |
|---|---|---|
| JP | S58173876 U | 11/1983 |
| JP | H5-14766 U | 2/1993 |
| JP | H0547619 U | 6/1993 |
| JP | 2003-240144 A | 8/2003 |
| JP | 2004360717 A | 12/2004 |
| JP | 2014-149035 A | 8/2014 |

OTHER PUBLICATIONS

English Translation Japanese Office Action dated Oct. 19, 2017, for Japanese Application No. 2014-263146 (4 p.).
Chinese Office Action dated Nov. 6, 2017, for Chinese Application No. 201510812770.0 (8 p.).
English Translation of Chinese Office Action dated Nov. 6, 2017, for Chinese Application No. 201510812770.0 (10 p.).
Chinese Patent Application No. 201510812770.0 Office Action dated Jan. 4, 2019 (18 pages).

* cited by examiner

FLOW CONTROL VALVE AND FUEL VAPOR PROCESSING APPARATUS INCORPORATING THE FLOW CONTROL VALVE

CROSS-REFERENCE TO RELATED APPLICATIONS

This application is based upon and claims priority to Japanese Patent Application Serial No. 2014-263146 filed on Dec. 25, 2014, the contents of which are incorporated herein by reference in their entirety for all purposes.

STATEMENT REGARDING FEDERALLY SPONSORED RESEARCH OR DEVELOPMENT

Not applicable.

BACKGROUND

This disclosure generally relates to a flow control valve and also relates to a fuel processing apparatus incorporating the flow control valve.

U.S. Patent Application Publication No. 2014/0216574A1 (also published as Japanese Laid-Open Patent Publication No. 2014-149035) discloses a flow control valve that may be used for a fuel vapor processing apparatus. The flow control valve is a relief valve including a positive pressure relieve valve and a negative pressure relief valve for maintaining a pressure within a fuel tank at an appropriate level when the fuel tank is closed. In each of the positive and negative pressure relief valves, an annular seal member is disposed between a valve member and a valve seat. The valve member can move to be seated on the valve seat and can move away from the valve seat. The annular seal member may elastically seal between the valve member and the valve seat when the valve member is seated on the valve seat for closing the valve. The seal member includes an annular base portion attached to the valve member. A seal lip protrudes obliquely inwards in the axial direction from the base portion for elastically contacting the valve seat.

To ensure the sealing property of the seal lip of the seal member, it may be necessary for the seal lip to be formed so as to allow easy elastic deformation to some extent. If, however, the seal lip can easily deform, the seal lip may be turned up when the valve member is in a closing position. The seal lip may be turned up due to the fluid pressure acting on the seal lip in the opposite direction, i.e., a direction radially from the outer side to the inner side. If this occurs, the sealing properties or performance of the seal lip may be deteriorated.

In view of the challenges discussed above, there is a need in the art for a technique of inhibiting turning-up of a seal lip of a seal member to make it possible to achieve an improvement in terms of sealing performance.

SUMMARY

In one aspect according to the present disclosure, a flow control valve may include a valve housing defining a flow passage. The flow control valve may further include a first valve device and a second valve device disposed in the flow passage and each comprising a valve member, a valve seat and a seal member. The valve member may be movable relative to the corresponding valve seat for opening and closing the flow passage. The seal member may be disposed between the corresponding valve member and the corresponding valve seat and may be configured to elastically seal therebetween when the corresponding valve member is in a closing position. The valve member of the first valve device may move in a first closing direction toward the closing position. The valve member of the second valve device may move in a second closing direction toward the closing position. The second closing direction may be opposite to the first closing direction. The seal member of at least one of the first valve device and the second valve device may include a base portion configured to be attached to one of the corresponding valve member and the corresponding valve seat, a seal lip extending from the base portion and configured to elastically contact the other of the corresponding valve member and the corresponding valve seat, and a turning-up inhibiting device configured to inhibit the seal lip from turning up due to a difference in pressure between an upstream side and a downstream side of the flow passage with respect to the seal member of the at least one of the first valve device and the second valve device when the corresponding valve member is in the closing position.

In one embodiment, a flow control valve may include a valve housing defining a flow passage including a first passage portion and a second passage portion communicating with each other, and a first valve device and a second valve device each comprising a valve member, a valve seat, an urging device and an annular seal member. The valve member may be movable relative to the corresponding valve seat for opening and closing the flow passage. The seal member may be disposed between the corresponding valve member and the corresponding valve seat and may elastically seal therebetween when the corresponding valve member is in a closing position. The urging device of the first valve device may urge the corresponding valve member in a first closing direction that is opposite to a direction of flow of fluid from the first passage portion to the second passage portion. The urging device of the second valve device may urge the corresponding valve member in a second closing direction that is opposite to the first closing direction. The seal member of at least one of the first valve device and the second valve device may include an annular base portion configured to be attached to one of the corresponding valve member and the corresponding valve seat, a conical tubular seal lip protruding obliquely inwards in an axial direction from the base portion and configured to elastically contact the other of the corresponding valve member and the corresponding valve seat, and an annular rib-shaped protrusion arranged to surround an outer periphery of the seal lip and configured to elastically contact the other of the corresponding valve member and the corresponding valve seat. In this way, the seal member of the first valve device may include the seal member including the base portion, the conical tubular seal lip and the annular rib-shaped protrusion; and/or the seal member of the second valve device may include the seal member including the base portion, the conical tubular seal lip and the annular rib-shaped protrusion.

With this arrangement, when the valve member of the at least one of the first valve device and the second valve device is in the closed position, the seal lip may elastically contact the other of the corresponding valve member and the corresponding valve seat, and the rib-shaped protrusion may elastically contact the other of the corresponding valve member and the corresponding valve seat at a position on the outer peripheral side of the seal lip. Therefore, a seal may be formed between the corresponding valve member and the corresponding valve seat. In addition, the rib-shaped protrusion may shut off the fluid pressure acting radially from the outer side to the inner side. As a result, potential turning-up of the seal lip of the seal member may be suppressed, making it possible to achieve an improvement in terms of sealing property or performance.

When no load is applied to the seal member of the at least one of the first valve device and the second valve device, a leading end in the axial direction of the rib-shaped protrusion may be positioned on a side of the base portion with respect to a leading end in the axial direction of the seal lip.

With this arrangement, as the valve member of the at least one of the first valve device and the second valve device moves toward the open position, the rib-shaped protrusion may be separated or move away from the other of the corresponding valve member and the corresponding valve seat before the seal lip is separated or moves away from the other of the corresponding valve member and the corresponding valve seat. On the other hand, as the valve member of the at least one of the first valve device and the second valve device moves toward the closing position, the seal lip may contact the other of the corresponding valve member and the corresponding valve seat before the rib-shaped protrusion contacts the other of the corresponding valve member and the corresponding valve seat.

The valve member of the first valve device and the valve member of the second valve device may be coaxially fitted with each other. The valve seat of the first valve device may be disposed at the valve housing, while the valve seat of the second valve device may be disposed at the valve member of the first valve device.

With this arrangement, it may be possible to achieve a reduction in the size of the flow control valve.

The first valve device may be a positive pressure release valve configured to be opened when a pressure within the first passage portion is not less than (i.e., greater than or equal to) a predetermined positive pressure value, while the second valve device may be a negative pressure release valve configured to be opened when the pressure within the first passage portion is less than a predetermined negative pressure value.

With this arrangement, it may be possible to achieve an improvement in terms of the valve-opening accuracy of the negative pressure relief valve. That is, in many cases, the predetermined positive pressure value of the positive pressure relief valve and the predetermined negative pressure value of the negative pressure relief valve may be set such that the "predetermined positive pressure value">the "predetermined negative pressure value". In this case, the urging force of the urging device of the second valve device may be smaller than the urging force of the urging device of the first valve device, so that it is possible to achieve an improvement in the accuracy in the valve-opening operation of the negative pressure relief valve.

The seal member of the first valve device and the seal member of the second valve device may be integrated to form a single seal member, and the single seal member may be disposed at the valve member of the first valve device.

With this arrangement, it may be possible to achieve a reduction in the number of components of the seal member, and to achieve an improvement in terms of the ease of mounting to the valve member of the first valve device.

The urging device of the at least one of the first valve device and the second valve device may be a coil spring arranged coaxially with the rib-shaped protrusion and having a coil diameter that is the same or substantially the same as a diameter of the rib-shaped protrusion.

With this arrangement, the urging force of the coil spring may be efficiently act on the rib-shaped protrusion, making it possible to improve the sealing property of the rib-shaped protrusion.

In another aspect according to the present disclosure, the flow control device may be one component of a fuel vapor processing apparatus. The fuel vapor processing apparatus may include a vapor passage configured to allow communication of a fluid between a fuel tank and a canister, and a closing valve disposed in the vapor passage and configured to open and close the vapor passage. The closing valve may include the flow control valve and may further include an electric valve electrically controlled for adjusting a flow rate of the fluid, and a bypass passage connected to the vapor passage to bypass the electric valve. The flow control device may be disposed in the bypass passage.

DETAILED DESCRIPTION OF EXEMPLARY EMBODIMENTS

A first embodiment will now be described with reference to FIGS. 1 to 9. A flow control valve 56 according to a first embodiment may be used for a fuel vapor processing apparatus 12 that may be mounted to a vehicle, such as an automobile. For the sake of convenience, the flow control valve 56 will be described after the description of the fuel vapor processing apparatus 12.

Figure 1:
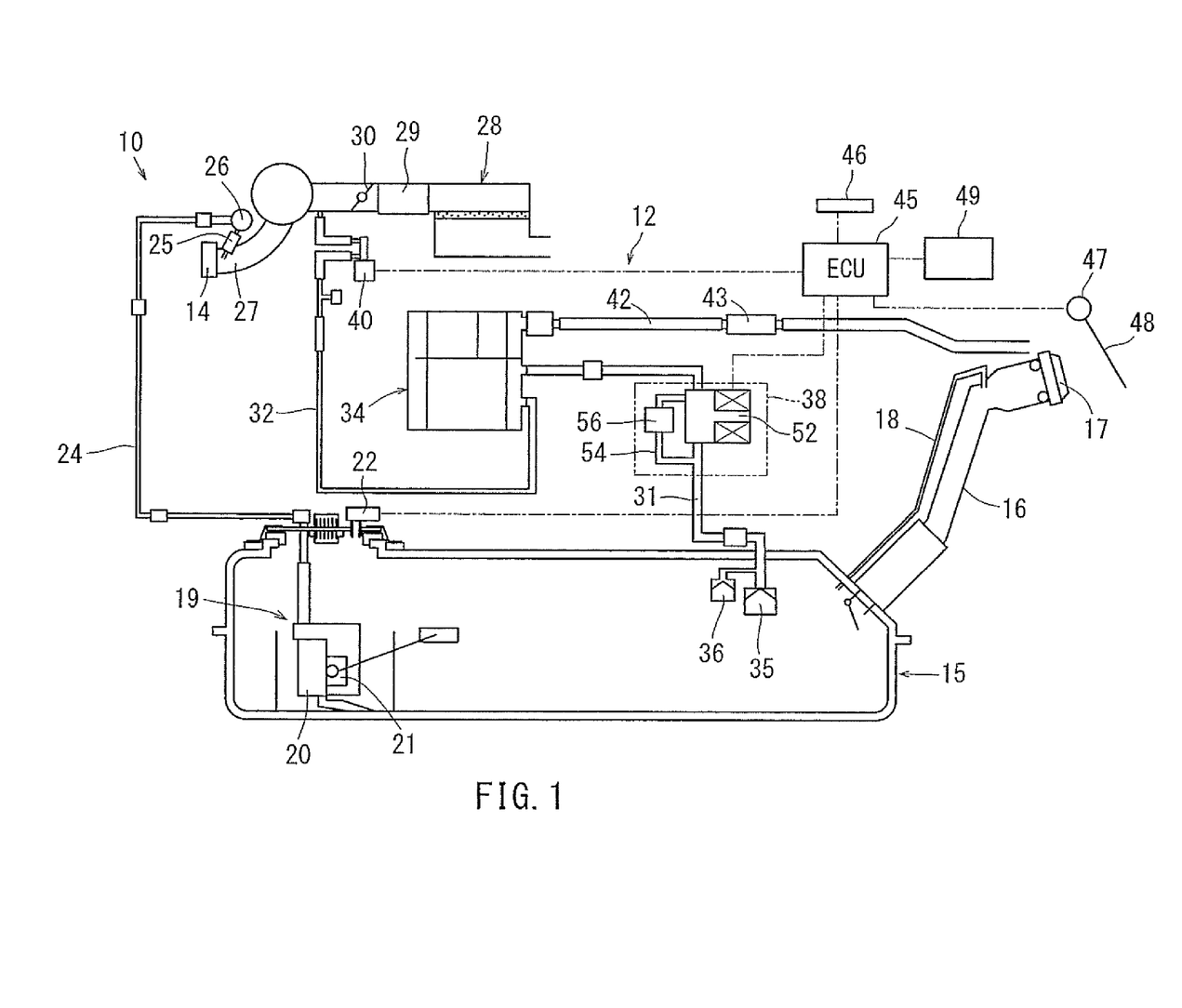
FIG. 1 is a schematic view illustrating the construction of a fuel vapor processing apparatus according to a first embodiment.

As shown in FIG. 1, the fuel vapor processing apparatus 12 may be used for an engine system 10 of a vehicle. The engine system 10 may include an engine 14, such as an internal combustion engine, and a fuel tank 15 for storing fuel to be supplied to the engine 14. The fuel tank 15 may include an inlet pipe 16. The inlet pipe 16 may have a refueling port at its upper end, so that fuel may be filled into the fuel tank 15 via the refueling port. A tank cap 17 may be detachably attached to the refueling port for opening and closing the same. A breather pipe 18 may provide communication between the interior of the upper end portion of the inlet pipe 16 and a gaseous space portion in the fuel tank 15.

A fuel supply device 19 may be dispose inside the fuel tank 15. The fuel supply device 19 may include a fuel pump 20 that may pump and pressurize the fuel in the fuel tank 15 before discharging the fuel from the fuel pump 20. The fuel supply device 19 may further includes a sender gauge 21 for detecting the surface level of the fuel stored in the fuel tank 15, and a tank inner pressure sensor 22 that can detect a pressure of fuel stored in the fuel tank 15 (hereinafter called a "tank internal pressure"). For example, the tank internal pressure sensor 22 may detect the tank inner pressure as a relative pressure value to the atmospheric pressure. The fuel pumped from within the fuel tank 15 by the fuel pump 20 may be supplied to the engine 14 via a fuel supply passage 24 and a delivery pipe 26. The delivery pipe 26 may include injectors (fuel injection valves) 25, so that fuel may be injected into an intake passage 27 from each injector 25. The number of the injectors 25 may correspond to the number of combustion chambers of the engine 14. An air cleaner 28, an airflow meter 29, a throttle valve 30, etc. may be disposed in the intake passage 27.

The fuel vapor processing apparatus 12 may include a vapor passage 31, a purge passage 32, and a canister 34. One end (upstream end) of the vapor passage 31 may be in fluid communication with the gaseous space in the fuel tank 15. The other end (downstream end) of the vapor passage 31 may be in fluid communication with the interior of the canister 34. One end (upstream end) of the purge passage 32 may be in fluid communication with the interior of the canister 34. The other end (downstream end) of the purge passage 32 may be in fluid communication with a part of the intake passage 27 on the downstream side of the throttle valve 30. The canister 34 may contain activated carbon (not shown) as an adsorbent material. The fuel vapor produced in the fuel tank 15 may flow into the canister 34 via the vapor passage 31 and may be adsorbed by the adsorbent material (activated carbon) contained in the canister 34.

At the upstream end portion of the vapor passage 31, there may be provided an on-board refueling vapor recovery valve (ORVR valve) 35 and a fuel cut-off valve 36. The ORVR valve 35 and the fuel cut-off valve 36 may be disposed in the gaseous space of the fuel tank 15. The ORVR valve 35 may be a filling-up preventing valve. The filling-up preventing valve 35 may include a float valve (not shown) that may be opened and closed according to the movement of a float (not shown) floating on the fuel surface due to its buoyancy. When the fuel level of the fuel tank 15 is less than a full level, the float valve may be opened. If the fuel is refueled into the fuel tank 15 until the fuel surface level is raised to the full level, the float valve may be closed, so that the vapor passage 31 may be shut off. When the vapor passage 31 is shut off by the ORVR valve 35, the inlet pipe 16 may be partially filled with the fuel to activate an auto stop mechanism of a fuel supply gun (not shown) for stopping the supply of fuel. The fuel cut-off valve 36 may also include a float valve (not shown) that may be opened and closed according to the movement of a float (not shown) floating on the fuel surface due to its buoyancy. The float valve may be normally maintained in the open position and may be closed, for example, when the vehicle has accidentally overturned, whereby the fuel in the fuel tank 15 can be prevented from flowing into the vapor passage 31.

A closing valve 38 may be disposed in the vapor passage 31 at a position along the vapor passage 31. The closing valve 38 may include an electric valve 52, a bypass passage 54, and a flow control valve 56. The electric valve 52 may be a motor-driven valve that includes, for example, a stepping motor and a controller that can adjust a valve-opening amount of a valve member (not shown) by controlling a stroke movement of the valve member. That is, the electric valve 52 can adjust the flow rate of a mixture of air and fuel vapor (hereinafter called a "fuel vapor containing gas") flowing through the vapor passage 31 under the electrical control of the stepping motor. The electric valve 52 may be opened and closed based on a drive signal that may be output from an engine control unit (hereinafter referred to as an "ECU") 45. The bypass passage 54 may be connected to the vapor passage 31 so as to bypass the electric valve 52. The flow control valve 56 may be disposed in the bypass passage 54 at a position along the bypass passage 54. The flow control valve 56 may serve to maintain the pressure in the fuel tank 15 at an appropriate level when the electric valve 52 is closed. The flow control valve 56 will be described later in detail.

A purge valve 40 may be disposed in the purge passage 32 at a position along the purge passage 32. The purge valve 40 may be opened and closed under the control of the ECU 45 such that the valve-opening amount of the purge valve 40 corresponds to the flow rate of a purge gas (i.e., the fuel vapor containing gas to be purged to the engine 14) calculated by the ECU 45, whereby a so-called purge control may be performed. The purge valve 40 may include a stepping motor (not shown) and a controller (not shown) that can adjust a valve-opening amount of a valve member (not shown) by controlling a stroke movement of the valve member. Alternatively, the purge valve 40 may include an electromagnetic valve or a solenoid valve that may be closed in the non-exited state and may be opened when exited.

An atmospheric passage 42 may have one end in fluid communication with the canister 34. The other end of the atmospheric passage 42 may be opened to the atmosphere. An air filter 43 may be disposed in the atmospheric passage 42 at a position along the atmospheric passage 42.

In addition to the tank inner-pressure sensor 22, the electric valve 52 of the closing valve 38 and the purge valve 40, a lid switch 46, a lid opener 47, a display device 49, etc. may be connected to the ECU 45. A lid manual opening/closing device (not shown) may be coupled to the lid opener 47 and may allow manual opening and closing of a lid 48 that may be attached to the refueling port. The lid 48 may include a lock mechanism (not shown) that can releasably lock the lid 48 at a close position for closing the refueling port. The lid opener 47 may be operable to release the lock of the lock mechanism of the lid 48. The lid switch 46 may output a signal for releasing the lock of the lid 48 to the ECU 45. When a signal for releasing the lock is supplied from the ECU 45 to the lid opener 47, and/or when the lid manual opening/closing device is operated for manually opening the lid 48, the lid opener 47 may release the lock of the lid 48.

Next, the basic operations of the fuel vapor processing apparatus 12 will be described. In the following explanation, it is assumed that, in the normal state, the flow control valve 56 of the closing valve 38 is in the closed state.

(1) Operation when the vehicle is not traveling (i.e., during parking or when the vehicle is at rest).

When the vehicle is not traveling, the electric valve 52 of the closing valve 38 may be maintained in the closed state. Therefore, no fuel vapor in the fuel tank 15 may flow into the canister 34. In addition, no air may flow from the canister 34 into the fuel tank 15. The purge valve 40 may be also maintained in the closed state. When the electric valve 52 is closed, for example, due to non-traveling of the vehicle, the pressure in the fuel tank 15 may be maintained at an appropriate value by the flow control valve 56 as will be described later.

(2) Operation when the vehicle is traveling.

If a predetermined purge condition is established when the vehicle is traveling, the ECU 45 may execute a purge control for desorbing the fuel vapor from the canister 34 and purging the purge gas (i.e., the mixture of air and fuel vapor) to the engine 14. In the purge control, the purge valve 40 may be opened and closed. When the purge valve 40 is opened, a negative pressure of intake air produced in the intake passage 27 of the engine 14 may act to the interior of the canister 34 via the purge passage 32. As a result, the fuel vapor adsorbed by the canister 34 may be desorbed and purged to the intake passage 27 together with the atmospheric air supplied via the atmospheric passage 32. The purge gas purged to the intake passage 27 may flow into the engine 14, so that fuel contained in the purge gas may be burned in the engine 14. The ECU 45 may control the electric valve 52 of the closing valve 38 to be opened as long as the purge operation of the fuel vapor is being performed. Therefore, the tank inner pressure of the fuel tank 15 may be maintained at a value that is close to the atmospheric pressure.

(3) Operation during refueling of the vehicle.

If the lid switch 46 is operated when the vehicle is not traveling, the ECU 45 may control the electric valve 52 of the closing valve 38 to be opened. In this case, if the tank inner pressure of the fuel tank 15 is higher than the atmospheric pressure, the fuel vapor in the fuel tank 15 may flow into the canister 34 via the vapor passage 31 and may be adsorbed by the adsorption material in the canister 34, simultaneously with the opening of the electric valve 52 of the closing valve 38. This may prevent the fuel vapor from dissipation into the atmosphere. At the same time, the tank inner pressure of the fuel tank 15 may be reduced to a value that may be close to the atmospheric pressure. When the tank inner pressure of the fuel tank 15 is reduced to the value close to the atmospheric pressure, the ECU 45 may output a signal to the lid opener 47 for releasing the lock of the lid 48. The lid opener 47 having received the signal for releasing the lock of the lid 48 may unlock the lid 48 to allow opening of the lid 48. Refueling to the fuel tank 15 may be started when the tank cap 17 is opened after the lid 48 is opened. The ECU 45 may control the electric valve 52 of the closing valve 38 such that the electric valve 52 is maintained in the open position until the refueling operation is completed (more specifically, until the lid 48 is again closed). In this way, during the refueling operation, the fuel vapor produced in the fuel tank 15 may flow through the vapor passage 31 to be adsorbed by the adsorbent material in the canister 34.

Next, the flow control valve 56 will be described with reference to FIGS. 2 to 4. For the purpose of explanation, the up-down direction (i.e., the vertical direction) of the flow control valve 56 will be determined based on the cross sectional view of FIG. 2. Preferably, the flow control valve 56 may be arranged such that its axial direction is oriented in the up-down direction (i.e., the vertical direction) of the vehicle.

Figure 2:
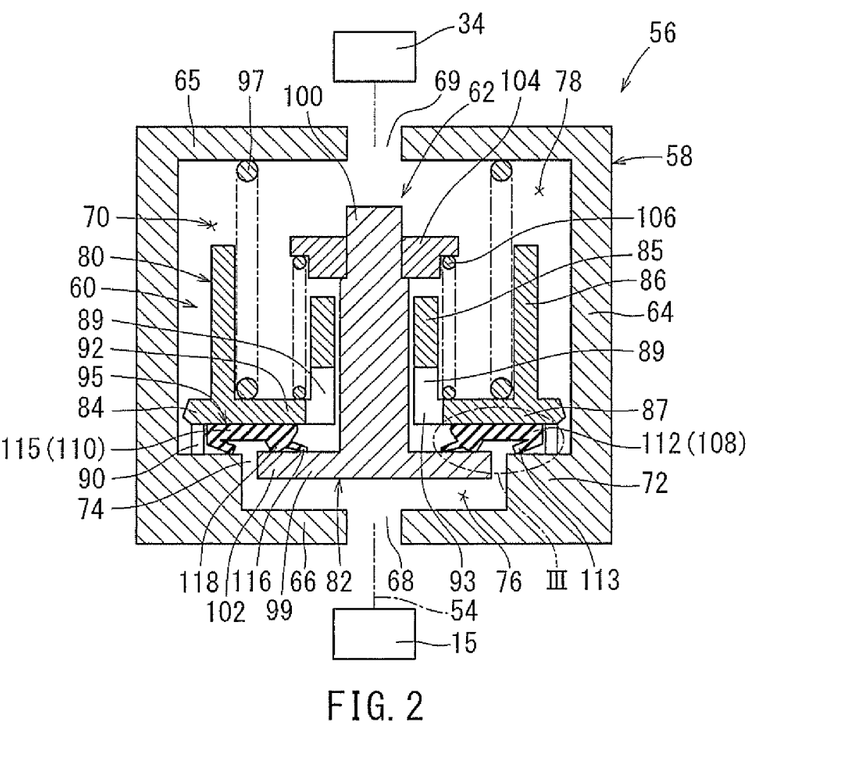
FIG. 2 is a cross sectional view of a flow control valve of the fuel vapor processing apparatus.

As shown in FIG. 2, the flow control valve 56 may include a valve housing 58, a positive pressure relief valve 60, and a negative pressure relief valve 62. In the state of FIG. 2, both relief valves 60 and 62 are closed. The valve housing 58 may include a cylindrical tubular side wall portion 64, a top wall portion 65 closing the upper end of the tubular side wall portion 64, and a bottom wall portion 66 closing the lower end of the tube side wall portion 64. At the center of the bottom wall portion 66, a first port 68 may be formed. At the center of the top wall portion 65, a second port 69 may be formed. Inside the valve housing 58, there may be formed a fluid communication space 70 for fluid communication between the first port 68 and the second port 69. A tank-side passage portion on the side of the fuel tank 15 of the bypass passage 54 may be connected to the first port 68. A canister-side passage portion on the side of the canister 34 of the bypass passage 54 may be connected to the second port 69.

At the inner circumference of the lower end portion of the valve housing 58, there may be formed a first valve seat 72 by decreasing the inner diameter of the fluid communication space 70. A first valve hole 74 may be defined inside of the first valve seat 72. The first port 68 and the first valve hole 74 may jointly define a first passage portion 76. The remaining space defined in the valve housing 57 and the second port 69 may jointly define a second passage portion 78. That is, the fluid communication space 70 defined inside of the valve housing 58 may include the first passage portion 76 and the second passage portion 78 communicating with each other.

Inside the fluid communication space 70, there may be disposed a first valve member 80 and a second valve member 82 that are arranged coaxially with each other. Each of the first valve member 80 and the second valve member 82 may be movable in the up-down direction (i.e., the vertical direction) along an up-down axis (i.e., a vertical axis). The positive pressure relief valve 60 may include the first valve member 80. The negative pressure relief valve 62 may include the second valve member 82. The first valve member 80 may include an annular valve plate 84, an inner tubular portion 85 and an outer tubular portion 86. The inner tubular portion 85 and the outer tubular portion 86 may form an inner and outer double tubular structure. An outer peripheral portion of the valve plate 84 extending radially inward by a given distance from the outer peripheral edge of the valve plate 84 may be defined as a first valve portion 87 for seating on the first valve seat 72 of the valve housing 58. The first valve portion 87 may open the first valve hole 74 when the first valve portion 87 moves upward away from the first valve seat 72. The first valve portion 87 may close the first valve hole 74 when the first valve portion 87 moves downward to be seated on the valve seat 72.

The inner tubular portion 85 may extend vertically upward from the inner peripheral portion of the valve plate 84. At the connection portion between the valve plate 84 and the inner tubular portion 85, there may be formed a plurality of communication holes 89 arranged in the circumferential direction and spaced from each other at equal intervals for communication between the first passage portion 76 and the second passage portion 78. In this embodiment, two communication holes 89 may be formed (see FIG. 2). The outer tubular portion 86 may extend vertically upward from the outer peripheral portion of the valve plate 84 at a position spaced radially inward from the outer peripheral edge by a given distance. A plurality of stopper members 90 may be formed on the lower surface of the outer peripheral edge portion of the first valve portion 87 and may be arranged at equal intervals in the circumferential direction. In this embodiment, eight stopper members 90 may be formed as shown in FIG. 4. The stopper members 90 may contact the first valve seat 72 when the first valve member 80 is in a closed position. The inner peripheral portion of the valve plate 84 may form a second valve seat 92. The space within the inner tubular portion 85 and the communication holes 89 may jointly define a second valve hole 93. A seal member 95 may be attached to the lower surface of the valve plate 84. The seal member 95 will be described later.

A first coil spring 97 may be interposed between the upper surface of the valve plate 84 of the first valve member 80 and the lower surface of the top wall portion 65 of the valve housing 58. The first coil spring 97 may be arranged so as to be coaxial with the valve plate 84. The first coil spring 97 may urge the first valve member 80 downwards, i.e., in the closing direction. The first coil spring 97 may be fitted within the outer tubular portion 86 of the first valve member 80.

The second valve member 82 may include a disc-shaped valve plate 99, and a shaft portion 100 having a shape of a round rod (i.e., a cylindrical rod). The shaft portion 100 may be fitted into the inner tubular portion 85 of the first valve member 80 from below. The outer peripheral portion of the valve plate 99 may form a second valve portion 102 for seating on the second valve seat 92 of the first valve member 80. The valve plate 99 may open the second valve hole 93 when the valve plate 99 moves downward away from the second valve seat 92. The valve plate 99 may close the second valve hole 93 when the valve plate 99 moves upward to be seated on the second valve seat 92. A spring receiving member 104 may be attached to the leading end portion (upper end portion) of the shaft portion 100. As the second valve member 82 moves downward in a valve opening direction, the spring receiving member 104 may contact the inner tubular portion 85 of the first valve member 80, so that a maximum valve-opening amount of the second valve member 82 may be defined.

A second coil spring 106 may be interposed between the upper surface of the valve plate 84 of the first valve member 80 and the lower surface of the spring receiving member 104 so as to be coaxial with these members 80 and 104. The inner tubular portion 85 of the first valve member 80 may be arranged inside the second coil spring 106. The second coil spring 106 may urge the second valve member 82 upwards, i.e., in the closing direction. The second coil spring 106 and the first coil spring 97 may be arranged so as to form an inner-outer double spring structure. The coil diameter, the coil length, and the coil wire diameter of the second coil spring 106 may be set to be smaller than those of the first coil spring 97. Thus, the urging force of the second coil spring 106 may be smaller than the urging force of the first coil spring 97.

Figure 5:
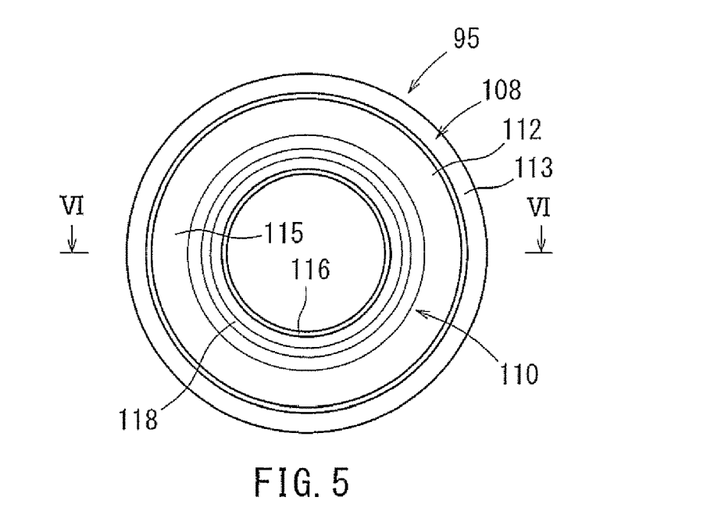
FIG. 5 is a bottom view of a seal member of the flow control valve.
Figure 6:
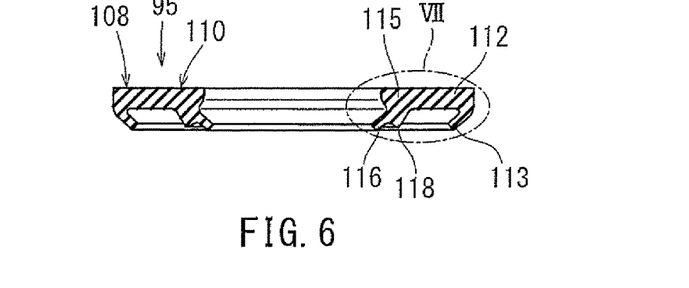
FIG. 6 is a cross sectional view taken along line VI-VI in FIG. 5.

Next, the seal member 95 will be described. As shown in FIGS. 5 and 6, the seal member 95 may include a first seal member 108 and a second seal member 110 arranged on the inner peripheral side of the first seal member 108. The first seal member 108 and the second seal member 110 may be integrated together. The seal member 95 may be formed of rubber or a like elastic material. The first seal member 108 may include a first base portion 112 having an annular plate shape, and a first seal lip 113 formed on the outer peripheral portion of the lower surface of the first base portion 112. The first seal lip 113 may have a shape of a conical tube protruding obliquely inwards in the axial direction from the lower surface of the first base portion 112. The second seal member 110 may have a second base portion 115 having a shape of an annular plate, and a second seal lip 116 formed on the outer peripheral portion of the lower surface of the second base portion 115. The second seal lip 116 may have a shape of a conical tube protruding obliquely inwards in the axial direction from the lower surface of the second base portion 115.

Figure 7:
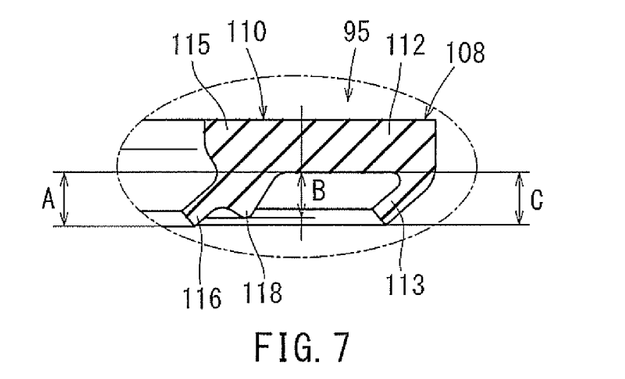
FIG. 7 is an enlarged view of a portion VII in FIG. 6.
Figure 8:
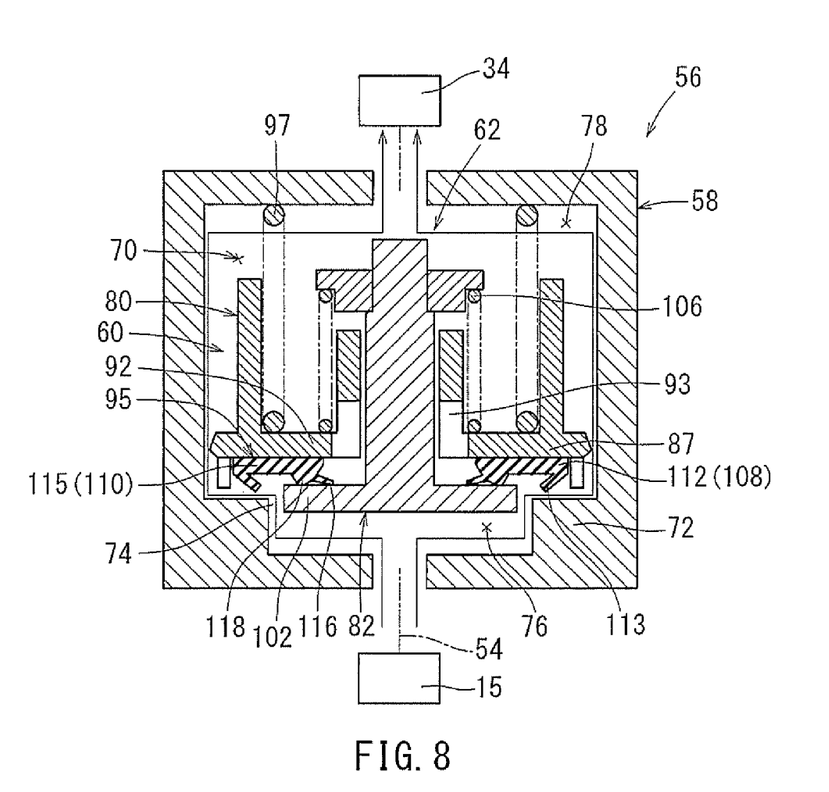
FIG. 8 is a cross sectional view as viewed from a front side of a positive pressure relief valve of the flow control valve in an open state.

As shown in FIG. 7, the second base portion 115 of the second seal member 110 may be formed in series with the inner peripheral side part of the first base portion 112 of the first seal member 108. In this embodiment, the upper surfaces of the two base portions 112 and 115 may be flush with each other and extend within a same plane. Similarly, the lower surfaces of the two base portions 112 and 115 may be flush with each other and extend within a same plane. Therefore, the two base portions 112 and 115 may have a same thickness in the vertical direction. The second seal member 110 may further include a rib-shaped protrusion 118. The rib-shaped protrusion 118 may have an annular shape surrounding the outer periphery of the second seal lip 116. The rib-shaped protrusion 118 may be formed in series with the outer peripheral side part of the base portion of the second seal lip 116. In this embodiment, the rib-shaped protrusion 118 may have an inverted-triangular sectional shape.

In the free state (no-load state) of the seal member 95, assuming that the protruding height of the second seal lip 116 from the lower surface of the second base portion 115 is "A", and that the protruding height of the rib-shaped protrusion 118 is "B" as shown in FIG. 7, there may be a relationship of "A>B". That is, the leading end (lower end) of the second seal lip 116 may be positioned below the leading end (lower end) of the rib-shaped protrusion 118. Further, assuming that the protruding height of the first seal lip 113 from the lower surface of the first base portion 112 is "C", there may be a relationship of "A>C>B". That is, the leading end (lower end) of the first seal lip 113 may be positioned between the leading end (lower end) of the second seal lip 116 and the leading end (lower end) of the rib-shaped protrusion 118.

As shown in FIG. 2, both base portions 112 and 115 of the seal member 95 may be attached to the lower surface of the first valve member 80 by an appropriate attaching device such as an adhesive. The first seal lip 113 of the first seal member 108 may be opposed to the first valve seat 72 of the valve housing 58 in the vertical direction. When the first valve member 80 is in the closing position, the first valve member 80 may be downwardly urged by the urging force of the first coil spring 97, whereby the leading end (lower end) of the first seal lip 113 of the first seal member 108 may elastically contact (i.e. closely contact) the first valve seat 72 (See FIG. 3).

The second seal lip 116 and the rib-shaped protrusion 118 of the second seal member 110 may be opposed to the second valve portion 102 of the second valve member 82 in the vertical direction. When the second valve member 82 is in the closing position, the second valve member 82 may be upwardly urged by the urging force of the second coil spring 106, whereby the second valve portion 102 of the second valve member 82 may elastically contact (i.e., closely contact) the leading end (lower end) of the second seal lip 116 of the second seal member 110 and may also elastically contact (i.e., closely contact) the leading end (lower end) of the rib-shaped protrusion 118 (See FIG. 3).

A predetermined positive side pressure value that is a valve-opening pressure value on the positive pressure side necessary for opening the positive pressure relief valve 60 (See FIG. 2) may be set by the first coil spring 97. If the pressure in the first passage portion 76 of the fluid communication space 70 (i.e., the pressure on the side of the fuel tank 15) is not less than (i.e., greater than or equal to) the predetermined positive side pressure value (i.e., the valve-opening pressure value on the positive pressure side), the first valve member 80 may move upward against the urging force of the first coil spring 97, whereby the positive pressure relief valve 60 may be opened (See FIG. 8). Then, the first seal lip 113 may be separated (move away) from the valve seat 72 so as to be brought into a free state or a no load state.

A predetermined negative side pressure value that is a valve-opening pressure value on the negative pressure side necessary for opening the negative pressure relief valve 62 may be set by the second coil spring 106. If the pressure within the first passage portion 76 of the fluid communication space 70 (i.e., the pressure on the side of the fuel tank 15) is less than the predetermined negative side pressure value (i.e., the valve-opening pressure value on the negative pressure side), the second valve member 82 may move downward against the urging of the second coil spring 106, whereby the negative pressure relief valve 62 may be opened (See FIG. 9). Then, the second seal lip 116 and the rib-shaped protrusion 118 may be separated (move away) from the second valve portion 102 of the second valve member 82 so as to be brought into a free state or a no load state.

Next, the operation of the flow control valve 56 of the closing valve 38 of the fuel vapor processing apparatus 12 (See FIG. 1) will be described. For the purpose of explanation, the state where the electric valve 52 of the closing valve 38 is in the closed state, and where both relief valves 60 and 62 of the flow control valve 56 are in the closed state (See FIG. 2) will be assumed to be an initial state. In this initial state, if a positive pressure not less than (i.e., greater than or equal to) the predetermined positive side pressure value (i.e., the valve-opening pressure value on the positive pressure side) is generated on the side of the fuel tank 15, the positive pressure relief valve 60 may be opened (See FIG. 8). Therefore, fluid may flow from the side of the fuel tank 15 to the side of the canister 34 via the first passage portion 76 and the second passage portion 78 (See arrows in FIG. 8). As a result, the pressure in the fuel tank 15 may be lowered.

Figure 9:
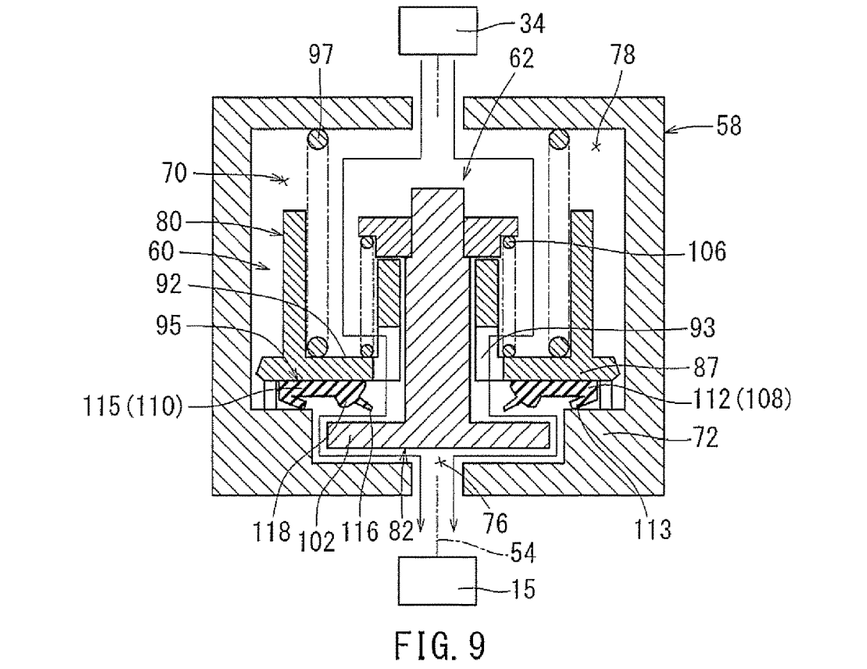
FIG. 9 is a cross sectional view as viewed from a front side of a negative pressure relief valve of the flow control valve in an open state.

If a negative pressure less than the predetermined negative pressure value (i.e., the valve-opening pressure value on the negative pressure side) for the negative pressure relief valve 62 is generated on side of the fuel tank 15, the second valve member 82 may be opened (See FIG. 9). Therefore, fluid may flow from the canister 34 to the side of the fuel tank 15 via the second passage portion 78 and the first passage portion 76 (See arrows in FIG. 9). As a result, the pressure in the fuel tank 15 may be raised.

With the flow control valve 56 of this embodiment (See FIG. 2) described above, when the second valve member 82 of the negative pressure relief valve 62 is in the closing position, the second seal lip 116 of the second seal member 110 of the seal member 95 may elastically contact the second valve portion 102 of the second valve member 82. In addition, the rib-shaped protrusion 118 may elastically contact the second valve portion 102 of the second valve member 82 on the outer peripheral side of the second seal lip 116 (See FIG. 3). As a result, a seal may be formed between the second valve member 82 and the second valve seat 92 of the first valve member 80. Further, the rib-shaped protrusion 118 may shut off the fluid pressure acting radially from the outer side to the inner side, i.e., the pressure on the positive pressure side in the first passage portion 76. As a result, potential turning-up of the second seal lip 116 of the second seal member 110 may be suppressed, making it possible to achieve an improvement in terms of sealing property or performance of seal lip 116.

Furthermore, the leading end (lower end) of the rib-shaped protrusion 118 in the free state of the second seal member 110 may be positioned on the side of the second base portion 115 with respect to the leading end (lower end) of the second seal member 110 of the second seal member 110 in the free state (See FIG. 7). Therefore, as the second valve member 82 moves to be opened from the closing position, the rib-shaped protrusion 118 may be separated from the second valve portion 102 of the second valve member 82 before the second seal lip 116 is separated from the second valve portion 102. Further, as the second valve member 82 moves to be closed from the open position, the second seal lip 116 may contact the second valve portion 102 of the second valve member 82 before the rib-shaped protrusion 118 contacts the second valve portion 102.

Furthermore, the first valve member 80 and the second valve member 82 may be coaxially fitted with each other such that the first valve seat 72 is arranged in the valve housing 58 and that the second valve seat 92 is arranged at the first valve member 80 (See FIG. 2). Therefore, it is possible to achieve a reduction in the size of the flow control valve 56.

Furthermore, the first valve member 80 may serve as a valve member of the positive pressure relief valve 60 and may be opened when the pressure in the first passage portion 76 is not less than (i.e., greater than or equal to) the predetermined positive pressure value, while the second valve member 82 may serve as a valve member of the negative pressure relief valve 62 and may be opened when the pressure in the first passage portion 76 is less than the predetermined negative pressure value (See FIG. 2). Therefore, it is possible to achieve an improvement in terms of the valve-opening accuracy of the negative pressure relief valve 62. That is, in many cases, the predetermined positive pressure value of the positive pressure relief valve 60 and the predetermined negative pressure value of the negative pressure relief valve 62 may be set such that the "predetermined positive pressure value">the "predetermined negative pressure value". In this case, the urging force of the second coil spring 106 may be smaller than the urging force of the first coil spring 97, so that it is possible to achieve an improvement in the accuracy in the valve-opening operation of the negative pressure relief valve 62.

Figure 3:
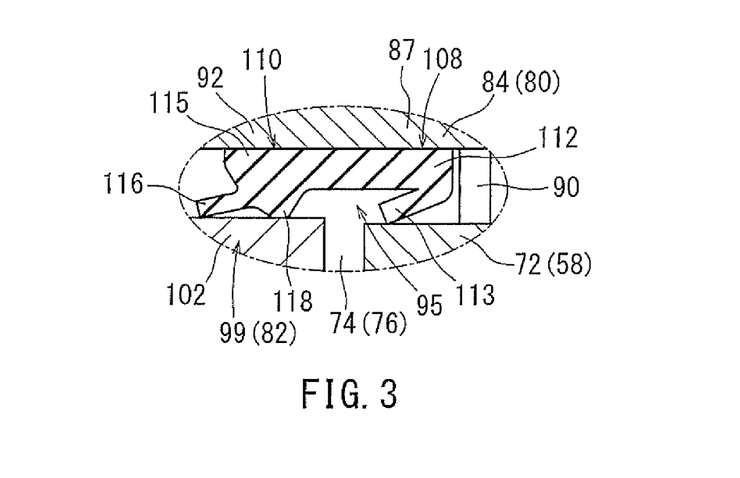
FIG. 3 is an enlarged view of a portion III in FIG. 2.
Figure 4:
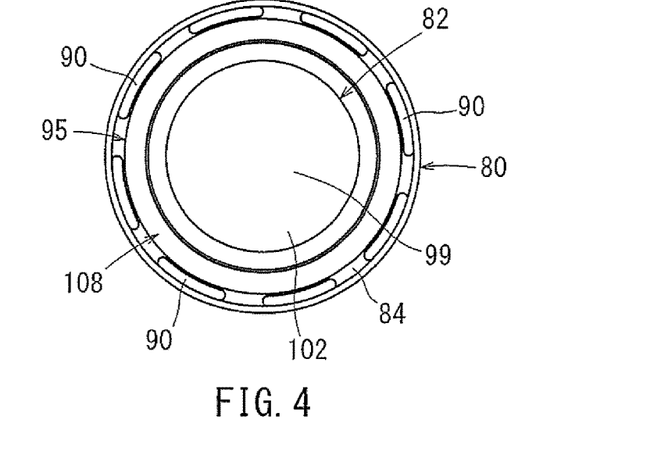
FIG. 4 is a bottom view of valve members of the flow control valve.

Furthermore, in the above embodiment, the first seal member 108 and the second seal member 110 may be integrated into the seal member 95 as a single seal member, and the seal member 95 may be arranged at the first valve member 80 (See FIGS. 2 and 3). Therefore, it is possible to achieve a reduction in the number of components of the seal member, and to achieve an improvement in terms of ease of mounting to the first valve member 80.

Furthermore, the fuel vapor processing apparatus 12 may include the vapor passage 31 for communication between the fuel tank 15 and the canister 34, and the closing valve 38 operable for opening and closing the vapor passage 31. In addition, the closing valve 38 may include the electric valve 52 electrically controlled for adjusting the flow rate, the bypass passage 54 for bypassing the electric valve 52, and the flow control valve 56 disposed in the bypass passage 54 (See FIG. 1). Therefore, the fuel vapor processing apparatus 12 may have the flow control valve 56 in which potential turning-up of the second seal lip 116 of the second seal member 110 is inhibited to achieve an improvement in terms of sealing property.

Figure 10:
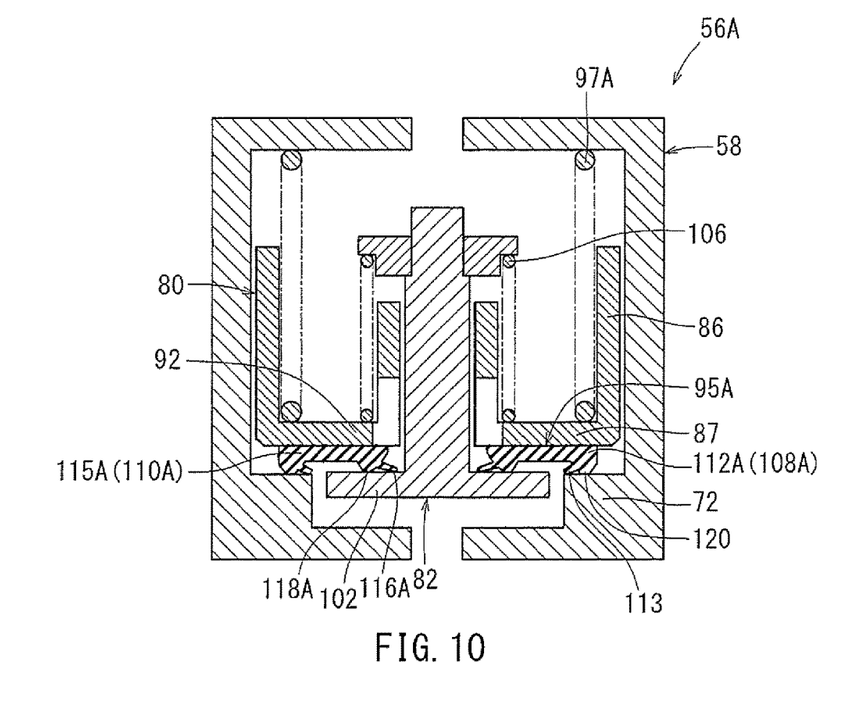
FIG. 10 is a cross sectional view of a flow control valve according to a second embodiment.

A second embodiment will now be described with reference to FIG. 10. This embodiment is a modification of the first embodiment and may be different from the first embodiment only in the construction of the flow control valve 56, in particular the seal member 95 and the first coil spring 97. In FIG. 10, members that are different from corresponding members of the first embodiment are labeled with the same reference numerals but with the additional letter "A" being affixed at the end thereof. The other components that are the same or similar to those of the first embodiment are labeled with the same reference numerals as the first embodiment and a redundant description will be omitted. As shown in FIG. 10, in the present embodiment, a diameter of a second seal lip 116A of a second seal member 110A may be smaller than the diameter of the second seal lip 116 of the second seal member 110 of the first embodiment (See FIG. 2). Further, a diameter of a rib-shaped protrusion 118A of a seal member 95A may be smaller than the diameter of the rib-shaped protrusion 118 of the seal member 95 of the first embodiment (See FIG. 2). More specifically, the diameter of the rib-shaped protrusion 118A may be set to be the same or substantially the same as the coil diameter of the second coil spring 106. As a result, the urging force of the second coil spring 106 may efficiently act on the rib-shaped protrusion 118A of the second seal member 110A, making it possible to improve the sealing property of the rib-shaped protrusion 118A.

Further, the first seal member 108A may include a rib-shaped protrusion 120 that may be similar in shape to the rib-shaped protrusion 118A. Further, the coil diameter of the first coil spring 97A may be larger than that of the first coil spring 97 of the first embodiment. More specifically, the coil diameter of the first coil spring 97A may be set to be the same or substantially the same as the diameter of the rib-shaped protrusion 120 of the first seal member 108A. As a result, the urging force of the first coil spring 97A may efficiently act on the rib-shaped protrusion 120 of the first seal member 108A, making it possible to improve the sealing property of the rib-shaped protrusion 120. With the increase in the coil diameter of the first coil spring 97A, the diameter of the outer tubular portion 86 of the first valve member 80 may be increased.

Figure 11:
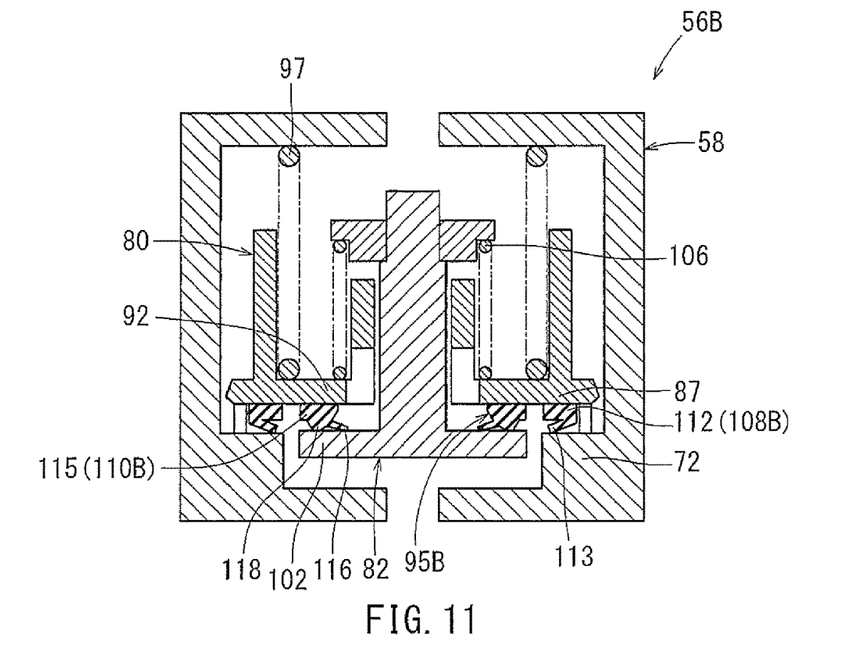
FIG. 11 is a cross sectional view of a flow control valve according to a third embodiment.

A third embodiment will now be described with reference to FIG. 11. Also, this embodiment is a modification of the first embodiment and may be different from the first embodiment only in the construction of the flow control valve 56, in particular the seal member 95. Therefore, in FIG. 11, members that are different from corresponding members of the first embodiment are labeled with the same reference numerals but with the additional letter "B" being affixed at the end thereof. The other members that are the same or similar to those of the first embodiment are labeled with the same reference numerals as the first embodiment and a redundant description will be omitted. As shown in FIG. 11, in this embodiment, a seal member 95B of a flow control valve 56B may include a first seal member 108A and a second seal member 110B that are separated from each other in the radial direction. That is, each of the two seal members 108B and 110B is formed as an independent seal member.

Figure 12:
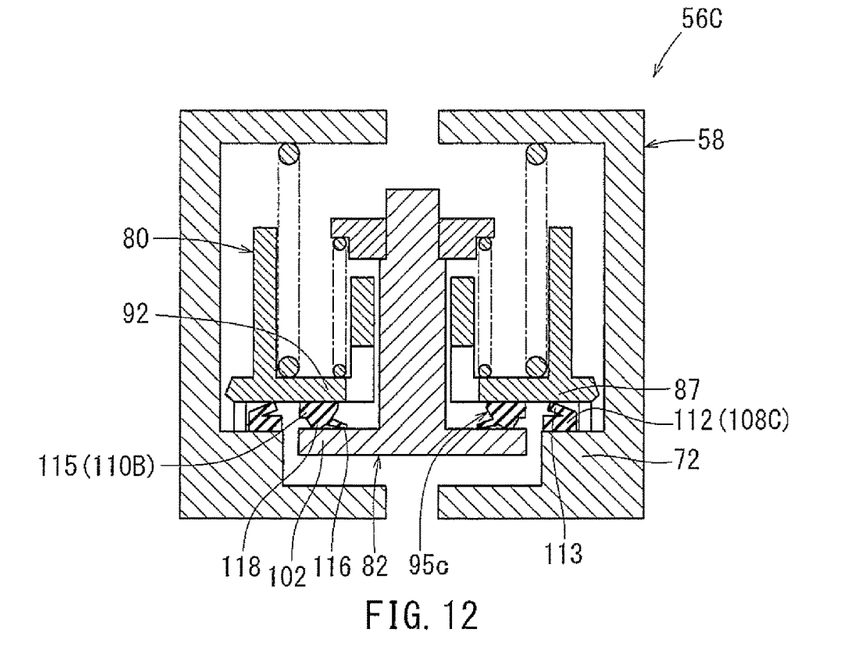
FIG. 12 is a cross sectional view of a flow control valve according to a fourth embodiment.

A fourth embodiment will now be described with reference to FIG. 12. This embodiment is a modification of the third embodiment. Therefore, in FIG. 12, like members components that are the same or similar to those of the third embodiment are labeled with the same reference numerals as the third embodiment and a redundant description will be omitted. As shown in FIG. 12, in a flow control valve 56C of this embodiment, a first seal member 108C of a seal member 95C may be different from the first seal member 108B in that the orientation of the first seal member 108C is reversed upside down such that the base portion 112 is positioned on the lower side of the first lip 113. In this connection, the base portion 112 may be attached to the first valve seat 72 of the valve housing 58. Therefore, the first seal lip 113 may elastically contact the first valve portion 87 of the first valve member 80.

Figure 13:
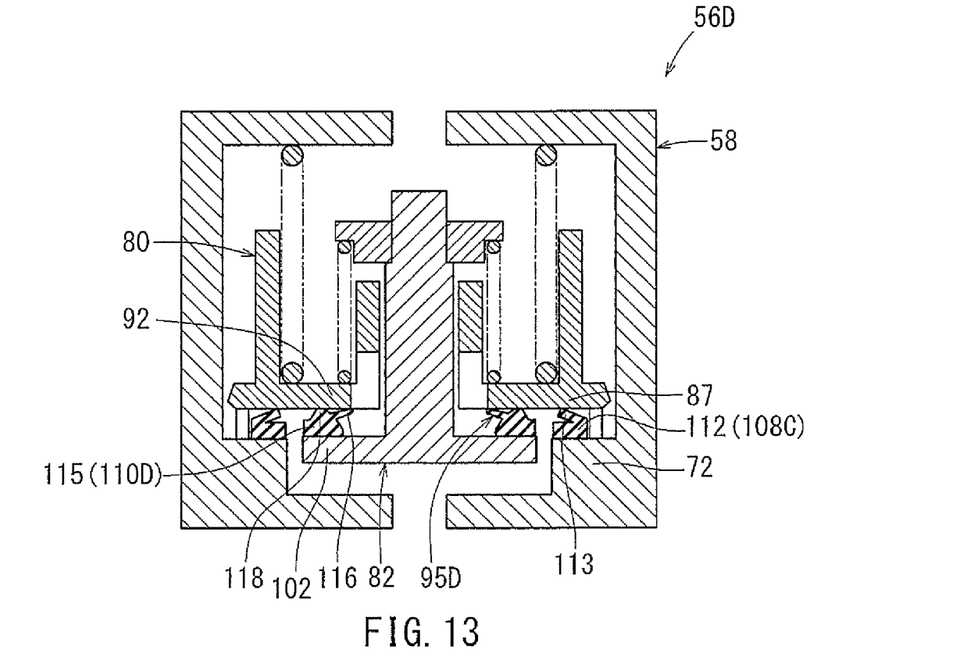
FIG. 13 is a cross sectional view of a flow control valve according to a fifth embodiment.

A fifth embodiment will now be described with reference to FIG. 13. This embodiment is a modification of the fourth embodiment. Therefore, in FIG. 13, like members components that are the same or similar to those of the fourth embodiment are labeled with the same reference numerals as the third embodiment and a redundant description will be omitted. As shown in FIG. 13, in a flow control valve 56D of this embodiment, a second seal member 110D of a seal member 95D may be different from the second seal member 110B in that the second seal member 110D is reversed upside down such that the base portion 115 is positioned on the lower side of the second seal lip 116 and the rib-shaped protrusion 118. In this connection, the base portion 115 may be attached to the second valve portion 102 of the second valve member 82. Therefore, the second seal lip 116 and the rib-shaped protrusion 118 may elastically contact the second valve seat 92 of the first valve member 80.

The above embodiments may be modified in various ways. For example, the flow control valve 56 (56A, 56B, 56C, 56D) may be used not only for the fuel vapor processing apparatus 12 but also for the other machines and apparatuses that require a control of flow of fluid. Further, as the electric valve 52, it may be possible to use an electromagnetic valve. For example, the electromagnetic valve may include an electromagnetic solenoid and may be configured to be closed in the non-exited state and to be opened when exited. Further, the seal lip and the rib-shaped protrusion of the seal member may be arranged so as to be spaced away from each other in the radial direction.

The various examples described above in detail with reference to the attached drawings are intended to be merely representative and thus not limiting. The detailed description is intended to teach a person of skill in the art to make, use and/or practice various aspects of the present teachings and thus is not intended to limit the scope of the invention. Furthermore, each of the additional features and teachings disclosed above may be applied and/or used separately or with other features and teachings to provide improved flow control valves, and/or methods of making and using the same.

Moreover, the various combinations of features and steps disclosed in the above detailed description may not be necessary to practice the present teachings in the broadest sense, and are instead taught to describe representative examples. Further, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed as informational, instructive and/or representative and may thus be construed separately and independently from each other. In addition, all value ranges and/or indications of groups of entities are also intended to include possible intermediate values and/or intermediate entities for the purpose of original written disclosure, as well as for the purpose of restricting the claimed subject matter.

What is claimed is:

1. A flow control valve, comprising:
  a valve housing defining a flow passage including a first passage portion and a second passage portion in communication with the first passage portion;

a first valve device and a second valve device each
  comprising a valve member, a valve seat, an urging
  device and an annular seal member;
wherein:
  the valve member of each of the first valve device and
    the second valve device is movable relative to the
    corresponding valve seat for opening and closing the
    flow passage;
  the annular seal member of each of the first valve
    device and the second valve device is disposed
    between the corresponding valve member and the
    corresponding valve seat and is configured to elas-
    tically seal therebetween when the corresponding
    valve member is in a closing position;
  the urging device of the first valve device is configured
    to urge the valve member of the first valve device in
    a first closing direction that is opposite to a direction
    of flow of fluid from the first passage portion to the
    second passage portion; and
  the urging device of the second valve device is con-
    figured to urge the valve member of the second valve
    device in a second closing direction that is opposite
    to the first closing direction; and
wherein the seal member of the first valve device and the
  seal member of the second valve device each comprise:
  an annular base portion configured to be attached to one
    of the corresponding valve member and the corre-
    sponding valve seat; and
  a conical tubular seal lip protruding obliquely inwards
    in an axial direction from the corresponding annular
    base portion and configured to elastically contact the
    other of the corresponding valve member and the
    corresponding valve seat;
wherein the seal member of at least one of the first valve
  device and the second valve device comprises an
  annular rib-shaped protrusion arranged to surround an
  outer periphery of the corresponding seal lip and con-
  figured to elastically contact the other of the corre-
  sponding valve member and the corresponding valve
  seat; and
wherein when the seal member including the annular
  rib-shaped protrusion is not engaged with the other of
  the corresponding valve member or the corresponding
  valve seat, the corresponding seal lip extends farther
  from the corresponding annular base portion than the
  rib-shaped protrusion.

2. The flow control valve according to claim 1, wherein:
the valve member of the first valve device and the valve
  member of the second valve device are coaxially fitted
  with each other;
the valve seat of the first valve device is disposed at the
  valve housing; and
the valve seat of the second valve device is disposed on
  the valve member of the first valve device.

3. The flow control valve according to claim 1, wherein:
the first valve device is a positive pressure release valve
  configured to be opened when a pressure within the first
  passage portion is greater than or equal to a predeter-
  mined positive pressure value; and
the second valve device is a negative pressure release
  valve configured to be opened when the pressure within
  the first passage portion is less than a predetermined
  negative pressure value.

4. The flow control valve according to claim 2, wherein
the annular base portion of the seal member of the first valve
device is integrated with the annular base portion of the seal
member of the second valve device so that the seal member
of the first valve device and the seal member of the second
valve device form a single seal member.

5. The flow control valve according to claim 1, wherein:
the urging device of the at least one of the first valve
  device and the second valve device is a coil spring
  arranged coaxially with the rib-shaped protrusion and
  having a coil diameter that is the same or substantially
  the same as a diameter of the rib-shaped protrusion.

6. A flow control valve, comprising:
a valve housing defining a flow passage;
a first valve device and a second valve device disposed in
  the flow passage and each comprising a valve member,
  a valve seat and a seal member;
wherein:
  the valve member of each of the first valve device and
    the second valve device is movable relative to the
    corresponding valve seat for opening and closing the
    flow passage; and
  the seal member of each of the first valve device and the
    second valve device is disposed between the corre-
    sponding valve member and the corresponding valve
    seat and is configured to elastically seal therebe-
    tween when the corresponding valve member is in a
    closing position;
  the valve member of the first valve device moves in a
    first closing direction toward the closing position;
  the valve member of the second valve device moves in
    a second closing direction toward the closing posi-
    tion, the second closing direction being opposite to
    the first closing direction;
wherein the seal member of the first valve device and the
  seal member of the second valve device each comprise:
  an annular base portion configured to be attached to one
    of the corresponding valve member and the corre-
    sponding valve seat; and
  a conical tubular seal lip protruding obliquely inwards
    in an axial direction from the corresponding annular
    base portion and configured to elastically contact the
    other of the corresponding valve member and the
    corresponding valve seat;
wherein the seal member of at least one of the first valve
  device and the second valve device comprises a turn-
  ing-up inhibiting device configured to inhibit the cor-
  responding seal lip from turning up due to a difference
  in pressure between an upstream side and a down-
  stream side of the flow passage with respect to the
  corresponding seal member when the corresponding
  valve member is in the closing position;
wherein when the seal member including the turning-up
  inhibiting device is not engaged with the other of the
  corresponding valve member or the corresponding
  valve seat, the corresponding seal lip extends farther
  from the corresponding annular base portion than the
  turning-up inhibiting device.

7. The flow control valve according to claim 6, wherein
the turning-up inhibiting device comprises a projection
projecting from the annular base portion, the projection
being configured to elastically contact the other of the
corresponding valve member and the corresponding valve
seat when the seal member of the at least one of the first
valve device and the second valve device is in the closing
position.

8. The flow control valve according to claim 7, wherein,
for the seal member including the projection, each of the seal
lip and the projection has an annular or tubular shape with
a central axis, and the projection is spaced from the seal lip
in a radial direction with respect to the central axis.

9. The flow control valve according to claim 8, wherein the annular base portion of the seal member of the first valve device is integrated with the annular base portion of the seal member of the second valve device so that the seal member of the first valve device and the seal member of the second valve device form a single seal member that is formed of a same elastic material.

10. A fuel vapor processing apparatus comprising:
a vapor passage configured to allow communication of a fluid between a fuel tank and a canister;
a closing valve disposed in the vapor passage and configured to open and close the vapor passage, the closing valve comprising:
an electric valve that is configured to be electrically controlled to adjust a flow rate of the fluid;
a bypass passage connected to the vapor passage to bypass the electric valve; and
a flow control valve disposed in the bypass passage, wherein the flow control valve comprises:
a valve housing defining a flow passage including a first passage portion and a second passage portion in communication with the first passage portion;
a first valve device and a second valve device each comprising a valve member, a valve seat, an urging device and an annular seal member;
wherein:
each valve member is movable relative to the corresponding valve seat for opening and closing the flow passage;
each seal member is disposed between the corresponding valve member and the corresponding valve seat and is configured to elastically seal therebetween when the corresponding valve member is in a closing position;
the urging device of the first valve device is configured to urge the valve member of the first valve device in a first closing direction that is opposite to a direction of flow of fluid from the first passage portion to the second passage portion; and
the urging device of the second valve device is configured to urge the valve member in a second closing direction that is opposite to the first closing direction;
wherein the seal member of the first valve device and the seal member of the second valve device each comprise:
an annular base portion configured to be attached to one of the valve member and the valve seat; and
a conical tubular seal lip protruding obliquely inwards in an axial direction from the corresponding annular base portion and configured to elastically contact the other of the valve member and the valve seat;
wherein the seal member of at least one of the first valve device and the second valve device comprises an annular rib-shaped protrusion arranged to surround an outer periphery of the corresponding seal lip and configured to elastically contact the other of the valve member and the valve seat; and
wherein when the seal member including the annular rib-shaped protrusion is not engaged with the other of the corresponding valve member or the corresponding valve seat, the corresponding seal lip extends farther from the corresponding annular base portion than the rib-shaped protrusion.

11. The fuel vapor processing apparatus according to claim 10, wherein:
the valve member of the first valve device and the valve member of the second valve device are coaxially fitted with each other;
the valve seat of the first valve device is disposed on the valve housing; and
the valve seat of the second valve device is disposed on the valve member of the first valve device.

12. The fuel vapor processing apparatus according to claim 10, wherein:
the first valve device is a positive pressure release valve configured to be opened when a pressure within the first passage portion is greater than or equal to a predetermined positive pressure value; and
the second valve device is a negative pressure release valve configured to be opened when the pressure within the first passage portion is less than a predetermined negative pressure value.

13. The fuel vapor processing apparatus according to claim 12, wherein the annular base portion of the seal member of the first valve device is integrated with the annular base portion of the seal member of the second valve device so that the seal member of the first valve device and the seal member of the second valve device form a single seal member.

14. The fuel vapor processing apparatus according to claim 11, wherein:
the urging device of the at least one of the first valve device and the second valve device is a coil spring arranged coaxially with the rib-shaped protrusion and having a coil diameter that is the same or substantially the same as a diameter of the rib-shaped protrusion.

15. The flow control valve according to claim 4, wherein the single seal member is disposed on the valve member of the first valve device.

16. The fuel vapor processing apparatus according to claim 13, wherein the single seal member is disposed on the valve member of the first valve device.

* * * * *